G. H. Keene,
Paddle Wheel.
No. 67,437.   Patented Aug. 6, 1867.
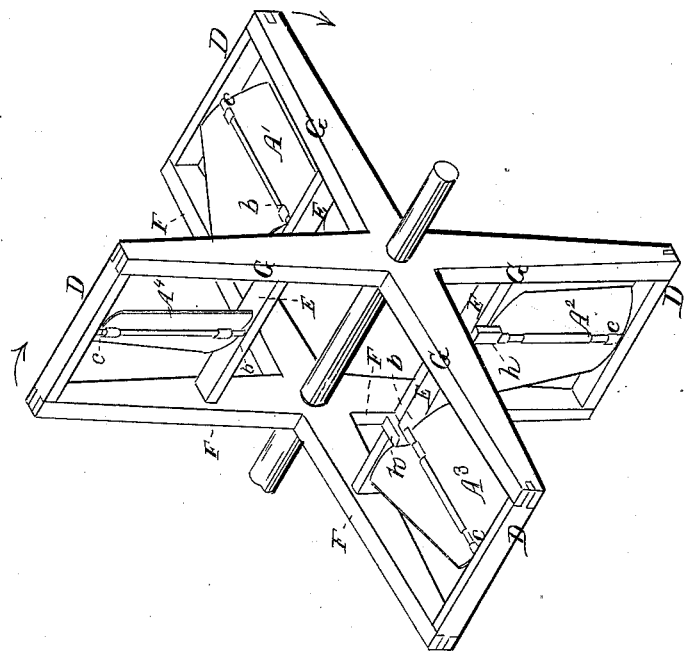
Geo. H. Keene, Inventor.
Witnesses:

United States Patent Office.

GEORGE A. KEENE, OF NEWBURYPORT, MASSACHUSETTS.

Letters Patent No. 67,437, dated August 6, 1867.

IMPROVED FEATHERING PADDLE-WHEEL.

The Schedule referred to in these Letters Patent and making part of the same.

TO ALL WHOM IT MAY CONCERN:

Be it known that I, GEORGE AUGUSTUS KEENE, of Newburyport, in the county of Essex, and State of Massachusetts, have invented a new and useful Improvement in Feathering Paddle-Wheels; and I do hereby declare that the following is a full, clear, and exact description of the construction and operation of the same, reference being had to the accompanying drawing, forming a part of this specification.

The nature of my improvement in feathering paddle-wheels is in the application of an independent self-feathering float or bucket instead of the ordinary float. It consists in arranging across the radial arms of a paddle-wheel two horizontal bars at the usual place of attaching or adjusting the floats, and pivoting, at about the centre of these bars, a float having sides or wings unequal in area and weight, and so arranging a stop as to allow a reciprocating rotary motion of the float upon its pivots of somewhat more than a quadrant, and less than two quadrants.

The construction and operation of this is as follows, referring to the drawing: The wheel is supposed to be revolving in the direction of the arrows. $A^1 A^2 A^3 A^4$ are the floats pivoted at $b\ c$ to cross-bars D and E, between the radii F and G of the wheel; $h$ is a stop, arranged so as to prevent more than the desired revolution of the feathering floats $A^1 A^2 A^3$ and $A^4$. Let us suppose float $A^1$ is just entering the water, its broader wing advanced, the unequal pressure exerted upon its two wings in consequence of their different area, will cause it slowly to rotate on its pivots as it passes through, becoming, when thoroughly immersed, parallel or nearly parallel to the radii of the wheel, as at $A^2$, and when it passes out, having its lesser wing advanced, as at $A^3$, thus feathering. On revolving past the vertex of the wheel it begins to descend, and the preponderance of weight in the side of greatest area causes a reciprocating rotation on the pivots, and brings the float again to the position of $A^1$. The stop should possess some elasticity, so that nothing may be broken.

This improvement may be readily applied to an old wheel by taking out the common floats and inserting cross-bars D and E. It will also be observed that reversal of motion produces just the same action. The floats always feather.

I do not claim as new the application of swivelled floats of unequal area in their wings, connected in pairs set at right angles, and operating each other; but I do claim as my invention, and desire to secure by Letters Patent of the United States—

1. The arrangement, in a paddle-wheel of independent floats, having each one wing preponderating in area and weight, pivoted to cross-bars D and E, so as to allow a reciprocating rotary motion through a limited arc, substantially as and for the purpose described.

2. And the further arrangement of stop $h$ in connection with floats having such a preponderating side, and pivoted to cross-bars D and E, substantially as described, and for the purpose of limiting such reciprocating rotary motion.

GEO. A. KEENE.

Witnesses:
    THOS. WM. CLARKE,
    DWIGHT B. RICH.